US010266726B2

(12) United States Patent
Haufe et al.

(10) Patent No.: US 10,266,726 B2
(45) Date of Patent: Apr. 23, 2019

(54) PRETREATMENT OF SUBSTRATES THAT HAVE UNSATURATED UNITS

(71) Applicant: SIKA TECHNOLOGY AG, Baar (CH)

(72) Inventors: Markus Haufe, Zürich (CH); Patricia Egli, Elgg (CH)

(73) Assignee: SIKA TECHNOLOGY AG, Baar (CH)

( * ) Notice: Subject to any disclaimer, the term of this patent is extended or adjusted under 35 U.S.C. 154(b) by 126 days.

(21) Appl. No.: 15/103,633

(22) PCT Filed: Dec. 11, 2014

(86) PCT No.: PCT/EP2014/077458
§ 371 (c)(1),
(2) Date: Jun. 10, 2016

(87) PCT Pub. No.: WO2015/086778
PCT Pub. Date: Jun. 18, 2015

(65) Prior Publication Data
US 2016/0319161 A1 Nov. 3, 2016

(30) Foreign Application Priority Data

Dec. 11, 2013 (EP) ..................................... 13196730
Feb. 17, 2014 (CH) ...................................... 0197/14

(51) Int. Cl.
| | | |
|---|---|---|
| *B29C 65/00* | (2006.01) | |
| *C09J 4/00* | (2006.01) | |
| *C09J 5/02* | (2006.01) | |
| *C09D 4/00* | (2006.01) | |
| *C09J 11/06* | (2006.01) | |
| *B32B 7/12* | (2006.01) | |
| *B32B 38/00* | (2006.01) | |
| *C09J 133/14* | (2006.01) | |
| *B29C 65/48* | (2006.01) | |
| *C08F 220/28* | (2006.01) | |

(52) U.S. Cl.
CPC ..................................... *C09J 4/00* (2013.01);
*B32B 7/12* (2013.01); *B32B 38/0004* (2013.01); *C09D 4/00* (2013.01); *C09J 5/02* (2013.01); *C09J 11/06* (2013.01); *C09J 133/14* (2013.01); *B29C 65/485* (2013.01); *B29C 65/4895* (2013.01); *B29C 66/855* (2013.01); *B32B 2250/40* (2013.01); *B32B 2305/72* (2013.01); *B32B 2307/51* (2013.01); *C08F 2220/281* (2013.01); *C09J 2407/006* (2013.01); *C09J 2407/008* (2013.01); *C09J 2409/006* (2013.01); *C09J 2409/008* (2013.01); *C09J 2415/006* (2013.01); *C09J 2423/166* (2013.01); *C09J 2423/168* (2013.01); *C09J 2433/00* (2013.01)

(58) Field of Classification Search
CPC .. B29C 65/485; B29C 65/4895; B29C 66/855
USPC ..... 156/95, 96, 98, 157, 159, 178, 247, 301, 156/307.3, 436, 506, 543, 546, 5, 49, 549
See application file for complete search history.

(56) References Cited

U.S. PATENT DOCUMENTS

| | | |
|---|---|---|
| 5,539,070 A | 7/1996 | Zharov et al. |
| 5,686,544 A | 11/1997 | Pocius |
| 5,718,977 A | 2/1998 | Pocius |
| 5,883,208 A | 3/1999 | Deviny |
| 6,248,846 B1 | 6/2001 | Zharov et al. |
| 6,383,655 B1 | 5/2002 | Moren |
| 6,630,555 B2 | 10/2003 | Kendall et al. |
| 7,247,596 B2 | 7/2007 | Jialanella et al. |
| 2003/0226472 A1 | 12/2003 | Kneafsey et al. |
| 2004/0068067 A1 | 4/2004 | Kneafsey et al. |
| 2011/0104508 A1 | 5/2011 | Wang et al. |

FOREIGN PATENT DOCUMENTS

| | | |
|---|---|---|
| CN | 1409728 A | 4/2003 |
| DE | 4308528 A1 | 10/1994 |
| JP | S48-018928 B1 | 6/1973 |
| JP | 2000-504353 A | 4/2000 |
| JP | 2012-530602 A | 12/2012 |
| RU | 2301242 C2 | 6/2007 |
| RU | 2335517 C2 | 10/2008 |

(Continued)

OTHER PUBLICATIONS

Jan. 30, 2015 Search Report issued in International Application No. PCT/EP2014/077458.
Jun. 14, 2016 International Preliminary Report on Patentability issued in International Application No. PCT/EP2014/077458.
Aug. 18, 2017 Office Action issued in Chilean Patent Application No. 2016-001406.
Jul. 19, 2017 Examination Report issued in Australian Patent Application No. 2014363459.
Mar. 15, 2018 Chilean Office Action issued in Chilean Patent Application No. 201601406.

(Continued)

*Primary Examiner* — Mark A Osele
*Assistant Examiner* — Nickolas R Harm
(74) *Attorney, Agent, or Firm* — Oliff PLC

(57) ABSTRACT

A method for treating substrates, including applying a composition, which includes at least one latent alkyl borane and is substantially free of decomplexing agents for the latent alkyl borane, to a substrate (1) that has a material having unsaturated units, applying a radically curable substance to the substrate (1) pretreated with the latent alkyl borane, and allowing the radically curable substance to cure in order to form a composite structure. The method is suitable in particular for applying paints, coatings, or sealing materials/filling materials to substrates, such as EPDM, NBR, and SBR, and for adhesively bonding such substrates. Composite materials adhesively bonded accordingly are distinguished by especially firm adhesion of the adhesive to the substrate, wherein conventional adhesives can be used, which have optimized properties with regard to the storage stability, open time, and cure time thereof.

16 Claims, No Drawings

(56) References Cited

FOREIGN PATENT DOCUMENTS

| WO | 2001/044311 A1 | 6/2001 |
| WO | 2010/025086 A1 | 3/2010 |
| WO | 2010/149746 A1 | 12/2010 |

OTHER PUBLICATIONS

Jul. 18, 2018 Office Action issued in Russian Patent Application No. 2016119429/05 (030593).
Sep. 29, 2018 Office Action issued in Chinese Patent Application No. 201480067025.1.
Nov. 6, 2018 Office Action issued in Japanese Patent Application No. 2016-537458.

PRETREATMENT OF SUBSTRATES THAT HAVE UNSATURATED UNITS

TECHNICAL FIELD

The present invention relates to a method for treating substrates, comprising a) applying a composition which comprises at least one latent alkylborane and is substantially free from decomplexing agents for the latent alkylborane to a substrate (1) which comprises a material having unsaturated units, b) applying a radically curable substance to the substrate (1) pretreated with the latent alkylborane, and c) curing the radically curable substance to form a composite structure. The present invention likewise relates to composite structures produced by the above-described method. As a result of the treatment of substrates which comprise materials having unsaturated units with a latent alkylborane, subsequent attachment of the radically curable substance to the surface of this substrate is significantly favored, and so the method can be used in particular for the adhesive bonding of substrates based on materials which have unsaturated units, or for the pretreatment for filling compounds and coatings.

Prior Art

Elastomeric substrates made from materials having unsaturated units, such as EPDM (ethylene-propylene-diene copolymer), NBR (acrylonitrile-butadiene rubber) or SBR (styrene-butadiene rubber), for example, are generally difficult to process with adhesives, sealants, or filling compounds. The joining or adhesive bonding of such substrates in particular is fraught with great difficulties, since conventional adhesives exhibit inadequate adhesion to such substrates.

A variety of approaches have been described to date to the adhesive bonding of substrates of these kinds.

The first approach is based on cold or hot vulcanization, where the substrate is first roughened and then a vulcanizable rubber mixture is applied to it. This mixture is subsequently vulcanized with pressure and/or heat. This method is used, for example, in the retreading of tires or the repair of conveyor belts. A disadvantage of this method, however, is that only the permanent joining of chemically similar elastomers is possible.

A further approach is based on the structural bonding of elastomers to chemically similar or different substrates, the only bonding having been described for this purpose to date having been essentially that with borane-initiated acrylate adhesives and borane initiators. Adhesives of this kind are described for example in U.S. Pat. No. 5,718,977, in U.S. Pat. No. 6,248,846, or in U.S. Pat. No. 6,383,655. US 2011/104508 A1 describes the adhesive bonding of elastomers and materials such as polyethylene, polypropylene, thermoplastic olefins (TPO), polyamides, syndiotactic polystyrene, or olefin-containing block copolymers and fluorinated polymers, such as tetrafluoroethylene. These documents primarily address the bonding of substrates with low surface energy, especially polypropylene, polytetrafluoroethylene, and high-density polyethylene (HDPE), which do not have unsaturated units.

In all of the aforementioned prior-art documents, the boron compound is used as a catalyst for acrylate components; following reaction with atmospheric oxygen, the boron compound reacts to form radicals which bring about the curing of the acrylate adhesive. For this purpose the catalyst is admixed to the adhesive shortly before processing, and immediately brings about curing of the material. A disadvantage of using such compositions is therefore that the adhesive after mixing has only a very short open time. Generally speaking, moreover, the adhesives are very expensive and are stable on storage only with restrictions (the adhesive must generally be stored cold). Another disadvantage of such adhesives is that in some cases they only develop strength very slowly.

A third approach involves bonding elastic substrates using contact adhesives. Such contact adhesives are generally formulated in solvents, such as ethyl acetate, THF, or heptane. A disadvantage of this approach, however, is that as applied to the adhesive bonding of rubbers, in particular, the strengths achievable are generally low and the aging stability achievable is generally limited.

A further possibility for the adhesive bonding of such substrates lies, finally, in the use of highly reactive isocyanate chemistry, which can be used to achieve joining to substrates such as EPDM. Described for such purposes have been, for example, compositions based on dicyclohexylmethane 4,4'-diisocyanate and polypropylene glycols, which may additionally contain further isocyanate components. In that case, however, the assembly strengths are low. Moreover, U.S. Pat. No. 3,968,198 described the use of iodine isocyanate, optionally in combination with polyisocyanates such as tolylene diisocyanate or trimethylolpropane/tolylene diisocyanate adducts. The use of iodine isocyanate is associated with considerable disadvantages, however, on account of its high reactivity and toxicity.

There is therefore a need for methods which enable elastic substrates in particular, comprising or consisting of polymers having unsaturated double bonds such as EPDM, NBR, or SBR, to be adhesively bonded; the method ought to allow the use of conventional adhesives while at the same time achieving effective joining of the substrate with the adhesives. It ought preferably to be possible to achieve similar bonding outcomes with the method as those achievable with the above-described two-part acrylate adhesives, but employing adhesives with good storage stability rather than adhesives not having that advantage.

Another problem with the substrates described is that paints, sealing materials, or filling compounds that are applied to them part relatively easily from the substrates, especially if the substrates are subject to vibration, deformation, or impact. There is therefore also a need for methods which enable improved adhesion of paints, sealing materials, or filling compounds to be achieved to elastic substrates.

Finally there is a need for simple and inexpensive methods for joining belt ends made from elastic materials (also referred to as splicing for the purposes of this document). With the methods used conventionally for this purpose, the reinforcing elements of two belt ends are first of all at least partially exposed, by removal of belt material from the reinforcing elements. Then unvulcanized rubber is introduced into the area in which the belt material has been removed, and the material introduced is vulcanized at elevated temperatures. A method of this kind is described in DE 43 08 528 A1, for example.

Disadvantages associated with these methods, however, are the high energy requirement, particularly for the final vulcanizing, and the technical effort and complexity required for this step. Hence it is not generally possible to repair a ruptured belt on site. Instead, the belt must be fully uninstalled for the repair material to be introduced and vulcanized. This can take a relatively long time, resulting in correspondingly long equipment downtimes.

The present invention solves these problems.

DESCRIPTION OF THE INVENTION

A first aspect of the present invention relates to a method for treating substrates, comprising a) applying a composition which comprises at least one latent alkylborane and is substantially free from decomplexing agents for the latent alkylborane to a substrate (1) which comprises a material having unsaturated units, b) applying a radically curable substance to the substrate (1) pretreated with the latent alkylborane, and c) curing the radically curable substance to form a composite structure.

When it is said above that the composition is substantially free from decomplexing agents for the latent alkylborane, this should be interpreted to mean that the composition has preferably less than 5 wt %, more preferably less than 2 wt %, and very preferably no detectable amounts of decomplexing agents.

A decomplexing agent, as this term is used here, is a compound which on contact with the latent alkylborane converts it into an active alkylborane—for example, by formation of an adduct of the decomplexing agent with the amine from an alkylborane-amine complex, with release of alkylborane. Following reaction with the decomplexing agent, an alkylborane is formed which contains or which generates free radicals under polymerization conditions. Examples of suitable decomplexing agents are given in the observations hereinafter.

A latent alkylborane for the purposes of the present invention is an alkylborane present in a form in which the formation of radicals is not favored. This may be the case, for example, by the fourth coordination site of the boron being not blocked by a substituent, but instead binding, for example, the free electron pair of a nitrogen or oxygen. The latent alkylborane is preferably present in tetracoordinated structure. An active species can form from the latent alkylborane, for example, by dissociation of a ligand, producing a free coordination site on the boron.

In one preferred embodiment of the above-described method, the radically curable substance is a paint, a coating, a sealing material, an adhesive or a filling compound.

In a further embodiment of the above-described method, a further step is carried out, between step b) and step c), in which the substrate (1) is contacted with a substrate (2) such that the radically curable substance is disposed between the two substrates, and the radically curing substance is in the form of an adhesive.

The material having unsaturated units is preferably an apolar, rubberlike material, more preferably a rubber, and more particularly is EPDM, NBR, SBR, or a mixture thereof. The apolar, rubberlike material or rubber ought judiciously to have a modulus of elasticity, determined in accordance with DIN 53457, of ≤1000 MPa, preferably in the range from 1 to 250 MPa, and more preferably 5 to 60 MPa.

It is further preferred for the substrate (1) to consist of the material having unsaturated units.

As far as the substrate (2) is concerned, there are no relevant restrictions on the present invention. If, however, a material having unsaturated units, such as EPDM, NBR, SBR, or a mixture thereof, for example, is likewise used for the substrate (2), then it is preferred for the substrate (2) likewise to be pretreated by application of a composition comprises at least one latent alkylborane and is substantially free from decomplexing agents for the latent alkylborane, before the substrate (2) is contacted with the substrate (1), or with the radically curable substance applied thereto.

In connection with the present invention, the radically curable substance is a substance which has unsaturated units. Such unsaturated units may be present for example in the form of C=C double bonds.

The radically curable substance is preferably an adhesive, a paint, a coating, a sealing material, an adhesive, or a filling compound. It may be based on any conceivable radically curable substances. It is preferred, however, if the radically curing substance has C=C double bonds.

In one preferred embodiment the radically curable substance is a substance based on (meth)acrylates, preferably an acrylate adhesive. It has emerged that commercially available acrylate adhesives, if used in the method outlined above, ensure effective joining to the substrate (1). In contrast, in the case of adhesives whose curing is not based on a radical process (such as polyurethane adhesives or epoxy adhesives, for example), no improvement in adhesion is observed through the pretreatment with a composition comprising at least one latent alkylborane.

It has further emerged that for substrates which have no unsaturated units, in the case for example of thermoplastic olefins, hot-dip-galvanized steel, HDPE, or unplasticized polypropylene, no improvement in adhesion can be found through pretreatment with latent alkylboranes. Looking at the above-described prior art, this appears to be surprising, since borane-initiated 2-part acrylate adhesives have been described which exhibit good adhesion on substrates including polyethylene and polypropylene, even if these substrates have not undergone any pretreatment and the borane complex has been admixed directly to the adhesive (see, for example, U.S. Pat. No. 6,383,655 B1 or U.S. Pat. No. 6,248,846 B1 or U.S. Pat. No. 5,718,977).

Without being tied to any particular theory, it is assumed that as a result of the application of the latent alkylborane to the substrate with unsaturated units, said substrate, following the conversion of the latent alkylborane to the active species, reacts with said species or with radicals generated by the active species, and thereby the substrate is tied into the polymerization of the radically curable substance.

For the purposes of the present invention, the composition comprises at least one latent alkylborane. This latent alkylborane is capable of forming trivalent alkylboranes.

Preferred latent alkylboranes are tetravalent compounds having four bonds to the boron, of which three are covalent and one is present in the form of an electronic association with an electron donor, preferably an amine. Formed from the complex is a species which generates free radicals, in the form of a trivalent alkylborane. This reaction is promoted if the latent alkylborane makes contact with a further substance, referred to below as decomplexing agent or initiator. The species that generates free radicals produces free radicals by reaction with oxygen from the surroundings.

Preferred latent alkylboranes are alkyl borates (e.g., alkyl borate salts) or alkylborane complexes (alkylborane-amine complexes, for example). An alkyl borate is a salt of a positive cation and an anionic tetravalent boron. Any alkyl borate which can be converted into an alkylborane on contact with a decomplexing agent can be used for the purposes of the present invention. A class of preferred alkyl borates (likewise known under the designation of quaternary boron salts) is disclosed for example in Kneafsey et al., US 2003/0226472, and Kneafsey et al., US 2004/0068067, both of which are hereby incorporated by reference.

In another embodiment the alkyl borate is an internally blocked borate, as described for example in Kendall et al., U.S. Pat. No. 6,630,555, which is hereby incorporated by reference. That document describes internally blocked borates with fourfold coordination, the boron atom being part of a ring structure which also has oxa and thio functionalities. In connection with alkyl borates as they are described here, the term "internally blocked" refers to a fourfold-coordinated boron species which is part of an internal ring structure which comprises two of the four boron coordination sites. The internal blocking encloses a structure of one or more rings, the boron atom being part of structures with one or more rings.

Particularly preferred borates for the purposes of the present invention are the alkali metal salts, more particularly the potassium salts, of tri-N-butylboron tert-butylate, tri-sec-butylboron tert-butylate, and also of diethylisopropyloxyboron tert-butylate. Another preferred borate is lithium tri-sec-butylborohydride, which is available for example under the trade name Calselect® LI from BASF.

Further latent alkylboranes which can be employed judiciously for the purposes of the present invention are dialkylboron compounds, such as, for example, diethylmethoxyborane, diethylisopropyloxyborane, the methylaminoethanol complex of diethylisopropyloxyborane, and methylaminoethoxy-dicyclo-hexylborane.

In one preferred embodiment the latent alkylborane is in the form of an alkylborane-amine complex. In this case the free radical-generating species is a trialkylborane or an alkylcycloalkylborane (i.e., the alkyloborane-amine complex may contain a trialkylborane or an alkylcycloalkylborane). Preferred such boranes conform to the formula B—($R^1$)$_3$, where B is boron and $R^1$ independently at each occurrence may be a $C_1$-$C_{10}$ alkyl group or a $C_3$-$C_{11}$ cycloalkyl group, or two or more of $R^1$ may be present in the form of a cycloaliphatic ring. Preferably $R^1$ is a $C_1$-$C_6$ alkyl group, more preferably a $C_1$-$C_4$ alkyl group, and most preferably a $C_1$-$C_3$ alkyl group. The preferred alkylboranes include triethylborane, triisopropylborane and tri-N-butylborane. If the latent alkylborane is in the form of an alkylborane-amine complex, the alkylborane is a trivalent alkylborane, whereas the amine may be any amine which forms a complex reversibly with the borane.

Alkylborane-amine complexes which can be used for the purposes of this invention have the general formula B(—$R^1$)$_3$AM, where $R^1$ independently at each occurrence may be a $C_1$-$C_{10}$ alkyl or $C_3$-$C_{10}$ cycloalkyl group, or where two or more of $R^1$ may form a cycloaliphatic ring. Preferably $R^1$ is a $C_{1-6}$ alkyl group, more preferably $C_1$-$C_4$ alkyl group, and most preferably $C_1$-$C_3$ alkyl group. Particularly preferred alkylboranes are, for example, triethylborane, triisopropylborane, and tri-n-butylborane. AM is an amine radical.

The amine which in accordance with the present invention is bound in the alkylborane-amine complex may be any amine or any mixture of amines which form a complex with the alkylborane, the complex being able to be split. This splitting may occur spontaneously, or else may be accelerated by addition of a decomplexing agent or by elevated temperatures. The attractiveness of using a particular amine in an alkylborane-amine complex may be calculated from the energy difference between the Lewis acid-base complex and the sum of the energies of the isolated Lewis acids (alkylborane) and bases (amine), known as binding energy, as is disclosed for example in Jialanella et al., U.S. Pat. No. 7,247,596, column 5, line 60 to column 6, line 28.

Binding energy=−[complex energy−(energy of Lewis acid+energy of Lewis base)]

Preferred amines include ammonia, primary or secondary amines, or polyamines which contain primary or secondary amine groups, as are described in U.S. Pat. No. 5,539,070 in column 5, lines 41 to 53, U.S. Pat. No. 5,106,928 in column 2, lines 29 to 58, or in U.S. Pat. No. 5,686,544 in column 7, line 29 to column 10, line 36. These include ethanolamine, secondary dialkyldiamines, or polyoxyalkylenepolyamines, amine-terminated reaction products of diamines, and compounds which have one or more groups that are reactive with amines. Such compounds are disclosed for example in U.S. Pat. No. 5,883,208 in column 7, line 30 to column 8, line 56. Looking at the reaction products disclosed in U.S. Pat. No. 5,883,208, they preferably comprise diprimary amines such as alkyl-diprimary amines, aryl-diprimary amines, alkylaryl-diprimary amines, and polyoxyalkylene-diamines. Particularly preferred amines include N-octylamine, 1,6-diaminohexane (1,6-hexanediamine), diethylamine, dibutylamine, diethylenetriamine, dipropylenetriamine, 1,3-propylenediamine (1,3-propanediamine), 1,2-propylenediamine, 1,2-ethanediamine, 1,5-pentanediamine, 1,12-dodecanediamine, 2-methyl-1,5-pentanediamine, 3-methyl-1,5-pentanediamine, triethylenetetraamine, and diethylenetriamine. Preferred polyoxyalkylenepolyamines include polyethylene oxide diamine, polypropylene oxide diamine, triethylene glycol propylenediamine, polytetramethylene oxide diamine, and polyethylene oxide-copolypropylene oxide diamine.

The amine in the organoborane-amine complex is preferably in the form of an alkyldiamine having at least one primary amino group, it being particularly preferred if the alkyl group contains 2 to 6 carbons, more particularly 2 to 4 carbons.

In one particularly preferred embodiment the alkylborane-amine complex comprises a trialkylborane or an alkylcycloalkylborane, and the amine comprises a primary amine, a secondary amine, a polyamine having primary or secondary amino groups or both, ammonia, a polyoxyalkylenamine, the reaction product of a diamine and a difunctional compound which has groups that react with amines, the reaction product having terminal amine groups, or an arylamine, a heterocyclic amine, a compound having a structural amidine unit, an aliphatic heterocycle which has at least one secondary nitrogen atom in the heterocyclic ring, it being possible for the heterocycle to include one or more secondary or tertiary nitrogen atoms, oxygen atoms, sulfur atoms, or double bonds in the heterocyclic system; alicyclic compounds which, bonded to the alicyclic ring, have one or more substituents which contain an amine group, or conjugated imines, or mixtures thereof.

Especially preferred alkylborane-amine complexes for the purposes of this invention are the triethylborane-diaminopropane complex, the triethylborane-diethylenetriamine complex, the tri-n-butylborane-methoxypropylamine complex, the tri-n-butylborane-diaminopropylamine complex, the tri-sec-butylborane-diaminopropane complex, the methylaminoethoxydiethylborane complex, and the methylaminoethoxydicyclohexylborane complex.

For the purposes of the present invention it is preferable for the composition comprising the at least one latent alkylborane to have a pH of about 7 or more, preferably a pH of 7 to 12, and especially preferably a pH of 7 to 10.

It is judicious if the composition comprising at least one latent alkylborane further comprises a solvent, this solvent necessarily having sufficient solubility for the latent alkylborane, so that this alkylborane is present in solution in the solvent. Particularly suitable solvents in combination with latent alkylboranes in accordance with the present invention include hexane, heptane, xylene, ethyl acetate, or mixtures thereof.

As far as the concentration of the latent alkylborane in the composition is concerned, the present invention is not subject to any relevant restrictions. All that is necessary is that the latent alkylborane is present in the composition in an amount which produces a notable improvement in the bonding of the substrate to the radically curable substance. Preferably the latent alkylborane is present in the composition in an amount of about 0.05 to 50 wt %, more particularly 1 wt % to 40 wt %, more preferably of about 2.5 to 30 wt %, and more preferably still of 2.5 to 20 wt %, and most preferably 5 to 10 wt %. It has emerged that with an amount of just 2.5 wt % of latent alkylboranes, a significant improvement in the torsional strength in MPa is achieved, whereas with quantities of 15 to 30 wt % the results are insignificantly better than at lower concentrations of the latent alkylborane.

It has emerged, moreover, that the addition of a radically curable monomer to the latent alkylborane may further improve the adhesion to the substrate. Suitable radically curable monomers in this context are, in particular, (meth) acrylates as described hereinafter for the radically curable substance. All that is required of these (meth)acrylates is that they do not exhibit decomplexing properties—meaning, among other things, that they have no carboxyl groups, are preferably liquid, and can be dissolved well in the solvent for the latent alkylborane. Examples of particularly preferred (meth)acrylates are methacrylates such as tetrahydrofurfuryl methacrylate and amino-methacrylates such as dimethylaminoethyl methacrylate. Mixtures of the stated (meth) acrylates may also be used.

The quantitative ratio of the additional radically curable monomers to the latent alkylborane (based on their weight in each case) is not critical, but is preferably situated in the range from 100:1 to 1:5, more particularly 10:1 to 1:5, more preferably 5:1 to 1:5, more preferably still 3:1 to 1:3 and most preferably between 2:1 and 1:2. Based on the amount of the radically curable monomer in the composition comprising the latent alkylborane, it is preferred, moreover, if the total amount of radically curable monomer in the composition is not more than 30 wt %, more particularly not more than 20 wt %, and more preferably not more than 15 wt %.

In the context of the present invention it has emerged in certain individual cases that the addition of amines to the latent alkylborane may be accompanied by particular advantages, especially if these amines promote the curing of the radically curable substance. For example, an additional amine may react with a peroxide or hydroperoxide that is used in the radically curable composition and hence may accelerate the curing of the radically curable composition. Suitable amines in this context are, for example, aromatic aniline derivatives, such as, in particular, N,N-diethylaniline, hydroxyethylated anilines, such as N,N-bis(2-hydroxyethyl)-p-toluidine (Bisomer PTE), and halogenated derivatives thereof. Particularly suitable amines for use with hydroperoxides are amine-aldehyde condensation products such as 3,5-diethyl-1,2-dihydro-1-phenyl-2-propylpyridine (DHP), for example. The addition of such amines to the latent alkylborane may therefore enhance the adhesion to elastic substrates, such as EPDM, SBR, and NBR.

As already elucidated above, the latent alkylborane may be activated by a decomplexing agent. The decomplexing agent may be present in the composition comprising the at least one latent alkylborane, in a composition for separate application, or in the radically curable substance. Preferably, though, the decomplexing agent is not present in the composition comprising the at least one latent alkylborane, since this can lead to premature activation of the latent alkylborane, as a result of which said alkylborane would be wholly or partly degraded. If the decomplexing agent is applied together with the latent alkylborane, therefore, it ought not to be mixed with the latent alkylborane until shortly before application. It is nevertheless preferred for the decomplexing agent to be present in the radically curable composition, since in that case the latent alkylborane is activated only on contact with the radically curable composition. It is, however, also possible for the decomplexing agent to be applied as a separate component after the application of the latent alkylborane to the layer resulting therefrom, this constituting a second pretreatment.

It may be necessary to make the splitting of the latent alkylborane easier, by heating the composition comprising the latent alkylborane, or the substrate to which it has been applied, to a certain temperature.

The decomplexing agent comprises or consists substantially of mineral acids, organic acids, Lewis acids, isocyanates, acyl chlorides, sulfonyl chlorides, aldehydes, or a combination thereof. Examples of organic acids with decomplexing agent suitability are acids according to the general formula R—COOH, where R may be hydrogen, an alkyl group having 1 to 20, preferably 1 to 11, and more preferably 1 to 4 carbon atoms or an aryl group having 6 to 10, preferably 6 to 8, carbon atoms. Likewise suitable are difunctional acids, examples being maleic acid or itaconic acid. The alkyl group may be a straight-chain or branched alkyl. It may be unsaturated or saturated. Exemplary acids include acrylic acid, methacrylic acid, acetic acid, benzoic acid, and p-methoxybenzoic acid. Examples of suitable Lewis acids are $SnCl_4$, $TiCl_4$, and the like. Examples of suitable mineral acids are HCl, $H_2SO_4$, $H_3PO_4$, and the like. Other suitable decomplexing agents are copolymerizable decomplexing agents, such as, for example, zinc di(meth) acrylate (available for example under the trade names Dymalink 705 and Dymalink 708), calcium di(meth)acrylate, or hydroxyethyl (meth)acrylate phosphate (available for example under the trade names Sartomer SR9051, 9050 or 9054).

In the context of the present invention it has proven particularly judicious to use bifunctional decomplexing agents which have both an unsaturated unit and an acid function. By way of the acid function, such compounds act as decomplexing agents for the latent alkylborane, while the unsaturated unit permits the decomplexing agent to be incorporated into the radically curable substance. As a result, the emergence of the decomplexing agent from the cured substance over time can be prevented. Particularly suitable decomplexing agents in this context are unsaturated carboxylic acids such as acrylic or methacrylic acid, itaconic acid, or monoadducts of hydroxy-functional (meth)acrylates such as hydroxyethyl methacrylate with dicarboxylic acids or their anhydrides such as succinic anhydride, for example.

The concentration of the decomplexing agent may be high enough to allow at least some of the latent alkylborane present in the composition to react with the decomplexing agent. Said agent is added preferably in an amount which corresponds to at least about 20 mol %, more preferably at least about 50 mol %, more particularly at least about 80 mol %, and most preferably at least about 100 mol %, based on the molar amount of the organic boron compound. For adhesives to be applied as part of further processing, said adhesives in turn comprise latent alkylboranes and decomplexing agents, it should be borne in mind here that the amount of the decomplexing agent present in the adhesive is generally tailored to the amount of latent alkylborane present. As a result of this, for a reaction with the latent alkylborane applied to the substrate, there is no sufficient amount of decomplexing agent available, especially if latent alkylborane and decomplexing agent are mixed and able to react with one another even before the adhesive is applied to the substrate. For calculating the above mol % figures, therefore, it is necessary first to subtract the molar amount of latent alkylborane in the adhesive from the molar amount of the decomplexing agent, and to calculate the amount of decomplexing agent based on the latent alkylborane applied to the substrate and on this corrected decomplexing agent content.

The decomplexing agent may be present for example in a concentration of more than 0.05 wt %, preferably more than 0.5 wt %, more preferably more than about 1 wt %, and most preferably more than about 2 wt %, based on the total weight of the composition. On the other hand the decomplexing agent may be present in a concentration of less than about 15 wt %, preferably less than about 10 wt %, more preferably less than about 7 wt %, and most preferably less than about 6 wt %, based on the total weight of the composition. It is also possible to use mixtures of two or more decomplexing agents, in which case the total weight of all decomplexing agents is within the ranges designated above.

With regard to the radically curable substance as well, the present invention is not subject to any relevant restrictions. As already elucidated above, however, it is preferred if the radically curable substance is based on acrylates or methacrylates. Preferred examples of acrylates and methacrylates include methyl (meth)acrylate, butyl (meth)acrylate, tert-butyl (meth)acrylate, 2-ethylhexyl (meth)acrylate, ethyl (meth)acrylate, isobornyl (meth)acrylate, cyclohexyl (meth)acrylate, trimethylcyclohexyl (meth)acrylate, lauryl (meth)acrylate, hydroxyethyl (meth)acrylate, glycidyl (meth)acrylate, tetrahydrofurfuryl (meth)acrylate, alkoxytetrahydrofurfuryl (meth)acrylate (e.g., ethoxylated or propoxylated tetrahydrofurfuryl (meth)acrylate), acrylamide, N-methylacrylamide, and other similar acrylate-containing monomers. The composition preferably comprises one, two, or more of the aforesaid (meth)acrylates.

In addition to the above-described (meth)acrylate monomers, the composition may have further radically polymerizable constituents. For example these are crosslinking monomers such as allyl (meth)acrylate or crosslinking difunctional or higher polyfunctional (meth)acrylates such as oligomeric or polymeric compounds of the formula (I).

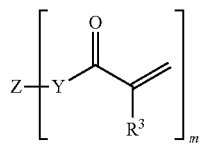

(I)

The radical $R^3$ here is a hydrogen atom or a methyl group. The index m is a value from 2 to 5. Additionally, Z is a polyol following removal of m hydroxyl groups, and Y is O or is NR', where R' is a hydrocarbon radical or is a hydrogen atom, preferably a hydrogen atom.

The compound of the formula (I) is more particularly selected from the group consisting of ethylene glycol di(meth)acrylate, 1,3- and 1,4-butanediol di(meth)acrylate, 1,6-hexanediol di(meth)acrylate, ethoxylated and propoxylated neopentyl glycol di(meth)acrylate, propoxylated glyceryl tri(meth)acrylate, trimethylolpropane tri(meth)acrylate, trimethylolpropane di(meth)acrylate, ethoxylated trimethylolpropane tri(meth)acrylate, modified pentaerythritol tri (meth)acrylate, propoxylated ethoxylated pentaerythritol tetra(meth)acrylate, ditrimethylolpropan tetra(meth)acrylate, and dipentaerythritol penta(meth)acrylate.

In particular, m in the compound of the formula (I) is a value of 2, and Z is a polymeric polyol following removal of two OH groups. This polymeric polyol is more particularly a polyalkylene polyol, a polyoxyalkylene polyol, or a polyurethane polyol; a polyhydroxy-functional ethylene-propylene-diene, ethylene-butylene-diene, or ethylene-propylene-diene copolymer; a polyhydroxy-functional copolymer of dienes such as 1,3-butanediene or diene mixtures with vinyl monomers such as styrene, acrylonitrile, or isobutylene; a polyhydroxy-functional polybutadiene polyol; a polyhydroxyfunctional acrylonitrile/butadiene copolymer; or a polysiloxane polyol.

Di- or trifunctional (meth)acrylates of these kinds are selected for example from the group consisting of polyethylene glycol di(meth)acrylate such as diethylene glycol di(meth)acrylate, triethylene glycol di(meth)acrylate, tetraethylene glycol di(meth)acrylate; polypropylene glycol di(meth)acrylate such as dipropylene glycol di(meth)acrylate, tripropylene glycol di(meth)acrylate; and tris(2-hydroxyethyl)isocyanurate tri(meth)acrylate.

With further suitability Z is a diphenol, more particularly an alkoxylated diphenol, following removal of two OH groups, preferably ethoxylated bisphenol A. A difunctional (meth)acrylate of this kind is available commercially, for example, under the trade name Sartomer® SR 348 from Sartomer Company, Inc., USA.

Examples of suitable further constituents of the radically curable substance include difunctional (meth)acrylates such as epoxy (meth)acrylates, more particularly epoxy (meth) acrylates obtainable from the reaction of bisphenol A diglycidyl ether with (meth)acrylic acid. A difunctional (meth) acrylate of this kind is available commercially for example under the trade name Sartomer® CN 104 from Sartomer Company, Inc., USA.

Likewise possible for use is the class of the vinyl-functionalized prepolymers. These are prepolymers which are functionalized terminally with vinyl groups in the form, for example, of (meth)acrylate groups. Suitable vinyl-functionalized prepolymers are based for example on polyhydroxy-terminated acrylonitrile/butadiene copolymers and are prepared typically from carboxyl-terminated acrylonitrile/butadiene copolymers, which are available commercially, for example, under the name Hypro® CTBN from Emerald Performance Materials, LLC, USA, and epoxides or amino alcohols.

Suitable vinyl-functionalized prepolymers of this kind of the formula (I) are available commercially for example from Kraton Polymers, USA, or under the trade names Hypro® VTB and Hypro® VTBNX from Emerald Performance Materials, LLC, USA. A further example of vinyl-functionalized prepolymers are acrylate-capped polybutadiene premolymers (oligomers, for example), which are available commercially, for example, from Emerald Performance Materials under the trade name Hypro. One such preferred compound is Hypro™ VTB 2000X168.

The vinyl-functionalized prepolymer may also be a polyurethane (meth)acrylate. Compounds of this kind are typically preparable, in a manner known to a person skilled in the art, from the reaction of at least one polyisocyanate, more particularly a diisocyanate, and a (meth)acrylic acid, a (meth)acrylamide or a (meth)acrylic ester which has a hydroxyl group. The diisocyanate may optionally be reacted, prior to the reaction with (meth)acrylic acid, a (meth) acrylamide, or a (meth)acrylic ester which has a hydroxyl group, with at least one polyol, more particularly a diol, in a process which is known to the person skilled in the art, to give a polyurethane polymer having isocyanate groups.

Especially suitable for reaction with the isocyanate groups of the polyisocyanate are hydroxyalkyl (meth)acrylates such as hydroxypropyl acrylate (HPA), hydroxypropyl methacrylate (HPMA), hydroxybutyl acrylate (HBA), or hydroxybutyl methacrylate (HBMA), preferably hydroxyethyl acrylate (HEA) or hydroxyethyl methacrylate (HEMA), or a monohydroxy poly(meth)acrylate of a polyol, preferably of glycerol or trimethylolpropane.

Polyurethane (meth)acrylates may likewise be prepared by esterification of a polyurethane polymer having hydroxyl groups with (meth)acrylic acid.

Furthermore, polyurethane (meth)acrylates may be prepared by the reaction of a (meth)acrylic ester which has at least one isocyanate group with a polyurethane polymer having hydroxyl groups, or with a polyol, of the kind described for example in the present document. An example of a suitable (meth)acrylic ester which has at least one isocyanate group is 2-isocyanatoethyl methacrylate.

Suitable polyisocyanates are commercial polyisocyanates, especially diisocyanates. Examples of suitable diisocyanates are 1,6-hexamethylene diisocyanate (HDI), 2-methylpentamethylene 1,5-diisocyanate, 2,2,4-, and 2,4, 4-trimethyl-1,6-hexamethylene diisocyanate (TMDI), 1,12-dodecamethylene diisocyanate, lysine diisocyanate and lysine ester diisocyanate, cyclohexane 1,3-diisocyanate, cyclohexane 1,4-diisocyanate, 1-isocyanato-3,3,5-trimethyl-5-isocyanatomethylcyclohexane (i.e. isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3-xylylene diisocyanate, m- and p-tetramethyl-1,4-xylylene diisocyanate, bis(1-isocyanato-1-methylethyl)naphthalene, 2,4- and 2,6-tolylene diisocyanate (TDI), 4,4'-, 2,4'- and 2,2'-diphenylmethane diisocyanate (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TODI), oligomers and polymers of the aforesaid isocyanates, and also any desired mixtures of the aforesaid isocyanates.

Suitable polyols are more particularly polyether polyols, polyester polyols, and polycarbonate polyols, and also mixtures of these polyols. Suitable polyols are listed, for example, as polyols P in European patent application EP 08169631.2, the entire disclosure content of which is hereby incorporated by reference.

The polyol is preferably a diol, more particularly polyoxypropylenediol or polyoxybutylenediol. Most preferably the polyols are polyols which are apolar as far as possible.

One preferred acrylate-capped polyurethane prepolymer is CN 973J75 from Sartomer Company, Inc.

Other prepolymers which can be used in the context of the present invention are those prepared from polyols, such as, for example, polypropylene glycol, polyethylene glycol, or polytetrahydrofuran. It is also possible to use mixtures of different polyols as a basis for the acrylate-capped prepolymers, such as, for example, a mixture of polypropylene glycol and polytetrahydrofuran or of polytetrahydrofuran and polyesters.

The vinyl-functionalized prepolymer is preferably an elastomer, more particularly a polyurethane (meth)acrylate and/or a vinyl-terminated acrylonitrile/butadiene copolymer.

The radically curable substance may consist of one of the aforementioned components. Preferably, however, the radically curable substance comprises a combination of two, three, or more components which can be cured by means of a radical polymerization. Without being tied to any particular theory, the use of two or more acrylates or methacrylates affords compositions which have one or more different advantageous properties, such as different wetting properties, different surface energies, different reactivities, different adhesive properties, or different fracture properties, for example.

It may also make sense to incorporate, as well as acrylates and/or methacrylates, further radically curable components, not based on acrylates or methacrylates, into the radically curable substance. Such additional components may be added generally in the form of monomers, oligomers, or as prepolymers. Examples of such components are styrene and alkylated styrene varieties (e.g., methylstyrene), allyl compounds, vinyl compounds, methallyl compounds, etc. It is preferred, however, if the amount of such additional monomers in the substance, if said substance comprises substantially acrylates or methacrylates, is less than about 40%, more particularly less than about 30%, more preferably less than about 20%, and most preferably less than about 10%, based on the total weight of the radically curable monomers in the radically curable substance.

The amount of radically curable constituents, i.e. of monomers and optionally oligomers and/or prepolymers, in the radically curable substance is preferably about 10 wt % or more, more preferably about 15 wt % or more, more preferably still about 20 wt % or more, and most preferably about 30 wt % or more, based on the total weight of the radically curable substance. The amount of compounds which can be polymerized by free radical polymerization is preferably about 90 wt % or less, based on the overall radically curable substance, more preferably about 85 wt % or less, and most preferably about 80 wt % or less.

In an example, which is nevertheless not intended to be restricting on the present invention, the radically curable substance may comprise one, two, three, or four compounds selected from the group consisting of methyl (meth)acrylate, tetrahydrofurfuryl (meth)acrylate, lauryl (meth)acrylate, an acrylate or methacrylate having an epoxide ring, and an acrylate- or methacrylate-capped alkanediene (butadiene for example) prepolymer.

The radically curable substance may also comprise one or more fillers. In a two-part polymerizable composition, the filler may be contained in the first part or in the second part, or in both parts. It has been observed that compositions which comprise two or more fillers exhibits surprisingly good adhesiveness to the substrates.

The fillers which may be used in the polymerizable composition include talc, mica, wollastonite, calcium carbonate, barium sulfate, magnesium carbonate, clay, aluminum dioxide, silicon dioxide, fumed silica, calcium sulfates, carbon fibers, glass fibers, metal fibers, silicon oxide sand, activated carbon, titanium dioxide, magnesium hydroxide, zeolite, molybdenum, kieselguhr, sericite, white sand, calcium hydroxide, calcium sulfite, sodium sulfate, bentonite, graphite, glass particles, glass beads, nanoparticles of clay, kaolinite, illite, smectite, sepiolite, vermiculite, pyrophyllite, sauconite, saponite, nontronite, montmorillonite, magnesium aluminum silicate, metal carbonates, feldspar, mica, quartz, and mixtures thereof. Suitable fillers may be treated or untreated. Exemplary fillers include without restriction talc, calcium carbonate, fumed silica, clay, or a combination thereof. A plurality of these fillers may be used. For example, the polymerizable composition may comprise fumed silica and a treated (or untreated) calcium carbonate.

Additionally it is possible for organic fillers to be incorporated into the polymerizable composition. Examples of suitable organic fillers are those which have elastomeric or impact strength-improving properties. Examples of such fillers are core-shell polymers, such as MBS or AIM types, for example, which are available under the trade name Durastrength® or Clearstrength® from Arkema, under the trade name Paraloid® from Dow Chemical, or Blendex® from KaneAce, for example. Other organic fillers which can be used are elastomers based on SBS block copolymers and the like (available for example under the trade name Kraton), and also chlorosulfonated polyethylenes, which are available for example under the trade name Hypalon or Tosoh CSM.

The filler may be used in a concentration of about 0 wt % or more, preferably about 5 wt % or more, and more preferably about 10 wt % or more, based on the total weight of the radically curable substance. The filler may be used in a concentration of about 50 wt % or less, preferably about 40 wt % or less, more preferably about 30 wt % or less, and most preferably about 25 wt % or less, based on the total weight of the polymerizable composition. For example, the filler may be present in a concentration of about 0 wt % to 50 wt %, preferably of about 5 wt % to about 40 wt %, and more preferably of about 10 to about 30 wt %, based on the total weight of the polymerizable composition.

Inorganic fillers are incorporated preferably in an amount of about 0 to 40% into the polymerizable composition, whereas organic fillers are present preferably in an amount in the range from 0 to 50% in the polymerizable composition.

A further aspect of the present invention relates to composite structures which are obtainable by a method as elucidated above.

The present invention likewise relates to the use of compositions comprising a latent alkylborane as adhesion promoters for the coating of substrates which comprise unsaturated units. In the context of this use, the substrates contain or comprise preferably likewise EPDM, SBR and/or NBR. It is particularly preferred if the substrates consist of EPDM, SBR and/or NBR.

"Adhesion promoter" in connection with the present invention means that the composition is used for pretreatment of the substrate and is itself substantially free from decomplexing agent. The adhesion promoter generally has a composition which is a deviation from the intended application, such as a paint, a sealant, or an adhesive. "Substantially" as used above should be interpreted to mean that the composition contains less than about 5 wt %, preferably less than about 2 wt %, and more preferably no decomplexing agents.

In one particularly preferred embodiment the composition described above is used as adhesion promoter for the adhesive bonding of substrates which comprise unsaturated units. It is preferred in this case if the composition is employed as a primer for the adhesive bonding of EPDM membranes or for the repair or the splicing of EPDM conveyor belts. In the case of the repair of conveyor belts, the above-described composition is used as adhesion promoter, to which a filling compound is applied in order to close off the defects.

As indicated above, a composition comprising a latent alkylborane is suitable as pretreatment for the splicing or for the repair of belts, more particularly of conveyor belts made from EPDM or other materials, which have unsaturated units on their surface. A further aspect of the present invention therefore relates to a method for splicing elastic belts, preferably EPDM belts, having reinforcing elements, comprising:

a) at least partially exposing the reinforcing elements of the belts, b) applying a composition which comprises at least one latent alkylborane and is substantially free from decomplexing agents for the latent alkylborane to the reinforcing elements and optionally to the edges of the belts, c) applying an adhesive to the areas pretreated with the latent alkylborane, and d) curing the adhesive to form a composite structure.

The "partial exposing" of the reinforcing elements means that at least part of the coating of the elastic belt material applied to the reinforcing elements is removed. Complete removal of the elastic belt material from the reinforcing elements is generally not necessary. Depending on the thickness and dimensions of the belt, this removing may be accomplished by a suitable method, such as by the cutting-out of belt material, for example.

By "edges of the belts" is meant the regions of the belt wherein the belt tapers from its original thickness to the thickness established after the removal of the belt material.

The reinforcing elements of the elastic belt consist preferably of a woven fabric or textile or of steel cables. Where the belt has reinforcing elements comprising a woven fabric or textile, it is judicious to remove, at the end of the belt, a part of the coating—composed of the elastic material—that is located above or below the reinforcing element. In the case of two belt ends to be joined by splicing, it is in this case preferred to remove belt material above the reinforcing element at one belt end and to remove belt material below the reinforcing element at the other belt end. If the belt contains a plurality of layers of reinforcing elements, then one or more of these layers may also be removed, provided the belt thereafter still has at least one reinforcing element layer.

The amount of belt material removed at the two belt ends is preferably such that the surface of one belt end forms a plane (that is, there should be no step formed) with the surface of the other belt end when the belt ends to be joined are placed one above the other. This has the advantage that the blocking of belt running during the intended use of the belt, through belt stripping or belt cleaning devices, for example, is avoided.

Where the reinforcing elements of the elastic belt consist of steel cables, then belt material in the space between two steel cables of one belt end is preferably also removed. As a result of so doing, the belt ends on splicing can be not only placed one above the other, but instead can also be joined in such a way that one steel cable end of one belt end comes to lie between two steel cable ends of the other belt end, and vice versa. Consequently it is possible reliably and simply to ensure that the joined belt exhibits a uniform surface without one of the two former belt ends projecting.

For preferred embodiments of the adhesive and of the composition which comprises at least one latent alkylborane, the remarks above are applicable analogously.

The adhesive can be applied in an amount such that after curing it fills the region of elastic belt which in the case of an unspliced belt would be filled by the elastic belt material. It is also possible, however, for the adhesive to fill only the space between the steel cables, while above and/or below the steel cables there is at least one sheetlike element provided which finishes areally with the top and/or bottom side of the belt ends. In the configuration of two sheetlike elements which finish areally with the top and bottom sides of the belt ends, a sandwich structure is formed after splicing, in the joining region of the two belt ends, in which a layer of steel cables and the adhesive is sandwiched by two layers of the sheetlike elements.

In one embodiment of the method of the invention, accordingly, it is preferred if in the region of the exposed reinforcing elements, in particular of the steel cables, sheetlike elements of elastic belt material are provided which extend over the region of the exposed reinforcing elements of the belt, in that the composition in step b) is applied to these elements, and in that the elements in step c) are contacted with the applied adhesive to form a sandwich structure, and this sandwich structure is cured in step d).

Even if the reinforcing elements consist of steel cables it is preferred for the method to be implemented such that the belt produced has no projection of one of the two former belt ends in the region of the adhesive bond. This can be ensured, for example, by smoothing the surface of the belt in the region of the bond before the adhesive is cured, and removing excess adhesive.

The at least one sheetlike element can consist either of the same material as the belt or of a different elastic material, provided this material has unsaturated units on its surface. In one embodiment the sheetlike element consists of the same material as the belt, preferably of EPDM. In another embodiment the sheetlike element consists of vulcanized rubber.

The strength of the spliced belt depends essentially on surface area in which the belt ends or reinforcing elements of the two belt ends overlap. A greater region of overlap generally results in a stronger adhesive bond. Where the belt to be spliced has reinforcing elements composed of steel cables, the splice length (i.e. the length over which the steel cable ends of both belt ends interengage) is preferably at least 140 mm, more preferably at least 160 mm. Higher splice lengths, i.e., lengths of more than 300 mm, in general no longer lead to improved adhesive bonds. On account of the greater amount of material needed for adhesive and pretreatment composition, therefore, splice lengths of more than 300 mm are less preferred.

A last aspect of the present invention relates, finally, to an elastic belt obtainable by a method as outlined above.

The above invention provides a simple and inexpensive method, with which it is possible for difficult-to-bond materials, comprising or consisting of EPDM, NBR or SBR, or mixtures thereof, to be adhesively bonded or coated. In contrast to the prior art, this method is accompanied by the advantages of extended open times, shortened cure times, and improved storage stabilities on the part of the adhesives used. Furthermore, commercially available acrylate adhesives can be used for the bonding, allowing the stated materials to be bonded inexpensively.

The above invention also provides an easy method for the splicing of elastic belts, which avoids the disadvantages of the prior art, particularly the need for the vulcanizing of rubber material. As a result of the effective adhesion to the substrate, there is generally no need for complete exposing of the reinforcing elements. Moreover, there is no need to consider any possible incompatibility between the unvulcanized rubber and the belt.

The present invention is described below by means of a number of nonlimiting examples, which are not intended, however, in any way to restrict the scope of protection of the application.

Example 1

Adhesion promoters with different amounts of organoborane-amine complexes are investigated for the adhesive bonding of NBR and SBR rubbers with the adhesive Sika Fast®-5211NT (based on tetrahydrofurfuryl methacrylate). For the test bond, an NBR or SBR substrate, respectively, is treated with an adhesion promoter composition comprising various amounts of triethylborane-diaminopropane complex (in solution in heptane). For the measurement, the adhesion promoter was applied using a brush. Following the application of the adhesion promoter and evaporation for a period of 15 to 30 minutes, the adhesion promoter remained on the substrate in a layer thickness of about 2 μm. Subsequently the adhesive is applied in a layer thickness of 1 mm to the area treated. The torsional strength of the adhesive bond was determined by the following test protocol:

First of all a round aluminum test specimen (crown-shaped, external diameter 25 mm; internal diameter 15 mm) was roughened with 60-100-grade abrasive paper. A round PTFE spacer was then inserted into this test specimen, and protrudes beyond the test specimen and serves to set a thickness of adhesive of 1 mm. Then the premixed adhesive was applied to the aluminum shape. The aluminum shape was subsequently pressed by the adhesive side onto a substrate, causing the adhesive to be disposed in the region of the aluminum shape minus the spacer. Excess adhesive, pressed out of the joint when the test specimen was mounted onto the substrate, was removed by means of a spatula. After the adhesive had been cured at 23° C. and 50% relative humidity for 24 hours, a screw was mounted on the aluminum test specimen, serving as a counterpiece and point of attack for the test machine. The test machine was then used to determine the torsional strength, with the test apparatus measuring the torque on yielding of the adhesive bond, the torsional strength being calculated from this torque. The values reported correspond to the average from three individual measurements.

The results are reproduced in Table 1:

TABLE 1

| | | Borane activator concentration series (TEB-DAP) | | | | | | | |
|---|---|---|---|---|---|---|---|---|---|
| | Pretreatment | BO 0% | BO 2.5% | BO 5% | BO 10% | BO 15% | BO 20% | BO 25% | ADPrep |
| NBR yellow rubber | Adhesive | 5211NT | 5211NT | 5211NT | 5211NT | 5211NT | 5211NT | 5211NT | 5211NT |
| | Torsional strength [MPa] | 0.42 | 5.88 | 5.32 | 6.92 | 6.31 | 4.83 | 6.35 | 0.33 |

TABLE 1-continued

| | | Borane activator concentration series (TEB-DAP) | | | | | | | |
|---|---|---|---|---|---|---|---|---|---|
| | Pretreatment | BO 0% | BO 2.5% | BO 5% | BO 10% | BO 15% | BO 20% | BO 25% | ADPrep |
| SBR black rubber | Adhesive Torsional strength [MPa] | 5211NT 1.57 | 5211NT 3.92 | 5211NT 3.97 | 5211NT 4.18 | 5211NT 3.93 | 5211NT 2.48 | 5211NT 2.91 | 5211NT 1.42 |

BO = Borane complex in solution in heptane, figure in weight percent
TEB-DAP = Triethylborane-diaminopropane complex
ADPrep = Sika ® ADPrep (Standard Primer for 2-part acrylate adhesives)
5211NT = SikaFast ®-5211NT It is found that with amounts of just 2.5 wt % of triethylborane-diaminopropane complex in the primer, a substantial improvement is possible in the torsional strength of the adhesive relative to treatment with a standard primer consisting of various monomeric acrylates and dihydroxybenzene and also isopropanol.

Example 2

An adhesion promoter with a triethylborane-diaminopropane complex content of 15 wt % (in solution in heptane) is tested as in Example 1 with different adhesives. A blank sample used instead of the triethylborane-diaminopropane complex is isopropanol. The torsional strength of the adhesive bonds was determined as in Example 1. The results of these tests are set out in Table 2. When the triethylborane-diaminopropane complex is used, a substantial effect is apparent on the torsional strength, relative to the use of isopropanol as blank sample. However, the primer containing the triethylborane-diaminopropane complex shows no improvement in torsional strength, with two commercial polyurethane adhesives (SikaGlaze®IG-50 and Sikaflex®-221), relative to a sample for which the substrate is not treated with triethylborane-diaminopropane complex.

TABLE 2

Combination of borane activator (BO 15%, weight percentage) with various adhesives/sealants

| Pretreatment | BO 15% | BO 15% | BO 15% | IPA | IPA | IPA |
|---|---|---|---|---|---|---|
| | | | NBR | | | |
| Adhesive | 5211NT | IG50 | SikaFlex-221 | 5211NT | IG50 | SikaFlex-221 |

TABLE 2-continued

Combination of borane activator (BO 15%, weight percentage) with various adhesives/sealants

| Pretreatment | BO 15% | BO 15% | BO 15% | IPA | IPA | IPA |
|---|---|---|---|---|---|---|
| Torsional strength [MPa]$^1$ | 6.31 | 0.95 | 0.61 | 0.18 | 0.98 | 1.27 |
| | | | SBR | | | |
| Adhesive | 5211NT | IG50 | SikaFlex-221 | 5211NT | IG50 | SikaFlex-221 |
| Torsional strength [MPa]$^1$ | 3.93 | 0.79 | 0.74 | 1.64 | 1.10 | 1.28 |

$^1$ = Average from three individual measurements
IPA = Isopropanol
IG50 = SikaGlaze ® IG50

Example 3

Two different EPDM substrates are treated as per Example 1 with isopropyl alcohol (IPA), 2.5 wt % or 15 wt % triethylborane-diaminopropane complex in hexane. Subsequently the pretreated substrates are left for evaporation and various adhesives are applied. The average peel force is then determined in accordance with DIN EN ISO 11339: 2010-06 per unit width in 100 mm/min after 18 days of storage at room temperature. The thickness of adhesive layer for this determination was 1 mm. The results of the measurements are set out in Table 3 below.

TABLE 3

| | EPDM Sika Pretreatment with IPA | EPDM Sika Pretreatment with 2.5% BO | EPDM Sika Pretreatment with 15% BO |
|---|---|---|---|
| SikaFast-5211NT | 1.25 N/mm Substrate tearout (near to surface) | 1.18 N/mm SF | 1.36 N/mm SF |
| SikaFlex-20AT | — | 1.68 N/mm SCF | 0.22 N/mm AF |
| SikaFlex-221 | — | 0.18 N/mm AF | 0.02 N/mm AF |

TABLE 3-continued

|  | EPDM Rocholl IPA | | EPDM Rocholl 2.5% BO | | EPDM Rocholl 15% BO | |
|---|---|---|---|---|---|---|
| SikaFast-5211NT | 0.77 N/mm | AF | 4.61 N/mm | SF | 4.33 N/mm | SF |
| SikaFlex-20AT | 3.15 N/mm | CF | 2.48 N/mm | 75% CF, 25% AF | 0.07 N/mm | AF |

EPDM Sika = SikaPlan Facade, thin and low-strength material with perforations (for water vapor permeability)
EPDM Rocholl = Semperit material
CF = cohesive failure of adhesive
AF = adhesive failure (adhesive has detached from substrate)
SF = Test material broken
SCF = cohesive failure of the adhesive, close to the substrate In the case of the combination of EPDM with an acrylate adhesive (SikaFast®-5211NT), substrate failure (SF) was found in all cases, indicating that the test material had broken. In contrast, in cases of use of moisture-crosslinking adhesives (Sikaflex®-20AT and Sika-Flex®-221), adhesive failure (AF) was determined in the majority of cases, where the adhesive had detached from the substrate. In certain cases, additionally, cohesive failure (CF) was found, where the adhesive had ruptured.

It is evident accordingly that the method of the invention using latent alkylboranes as primers produces improved adhesion of radically curable adhesives to substrates such as EPDM, NBR, and SBR.

Example 4

An EPDM-based substrate (conveyor belt material) was treated with various compositions as per Example 1. The adhesive SikaFast®-5211NT was subsequently applied to the pretreated substrate and cured. Compositions used were 1. pure ethyl acetate, 2. a mixture of 10 wt % triethylborane-1,3-diaminopropane and 90 wt % ethyl acetate, 3. a mixture of 10 wt % triethylborane-diethylenetriamine and 90 wt % ethyl acetate, and 4. a mixture of 10 wt % tributylborane-methoxypropylamine and 90 wt % ethyl acetate. Following the application of each composition and evaporation of the solvent, a bead of SikaFast®-5211NT adhesive was applied. The adhesive bead had dimensions of 12.5 mm×5 mm×125 mm and was applied by placing a planar mold with a cutout of the aforementioned dimensions onto the pretreated substrate, introducing the adhesive into this cutout, and curing it at 23° C./50% relative humidity for 24 hours. After curing had taken place, the bead adhesion was ascertained by attempting to peel the bead manually from the substrate. In the case of the first composition, it was evident after the curing of the bead of adhesive that it can be peeled off easily from the substrate by hand. In the case of the remaining compositions, a high force was needed in order to detach the bead from the substrate. This corresponds approximately to the observations in Examples 1 to 3. In the third case, the bead could no longer be detached from the substrate by hand without destruction of the bead.

Example 5

As described in Example 4, an EPDM-based substrate (conveyor belt material) was pretreated with various compositions in accordance with Table 4. The torsional strength of an adhesive (SikaFast-5221 NT) applied to the pretreated surface was then determined as described in Example 1. The results and compositions for these investigations are reproduced in Table 4 below:

TABLE 4

|  | 1 | 2 | 3 | 4 | 5 | 6 | 7 |
|---|---|---|---|---|---|---|---|
| EPDM Pretreatment | | | | | | | |
| Ethyl acetate | 100 | 80 | 100 | 99 | 90 | 75 | 50 |
| Borane complex[1] |  | 10 | 0.1 | 0.1 | 0.1 | 0.1 | 0.1 |
| THFMA[2] |  | 10 |  | 1 | 10 | 25 | 50 |
| Total | 100 | 100 | 100.1 | 100.1 | 100.1 | 100.1 | 100.1 |
| Torsional strength [MPa] | 0.5 | 5.8 | 2.5 | 4.7 | 4.4 | 1.4 | 1.2 |

[1]Triethylborane-1,3-diaminopropane complex
[2]Tetrahydrofurfuryl methacrylate

Example 6

As described in Example 4, an EPDM-based substrate (conveyor belt material) was pretreated with various compositions in analogy to Example 1.

Subsequently, as in Example 4, beads of various adhesive systems were applied to the pretreated substrates and cured at 23° C./50% relative humidity for 7 days. The bead adhesion of this adhesive bond was determined as described in Example 4. The results and compositions for these investigations are reproduced in Table 5 below:

TABLE 5

|  | Sample 1 | Sample 2 | Sample 3 | Sample 4 |
|---|---|---|---|---|
| EPDM Pretreatment | | | | |
| Ethyl acetate | 100 | 90 | 80 | 80 |
| Borane complex[1] |  | 10 | 10 | 10 |
| THFMA[2] |  |  | 10 |  |
| Dimethylaminoethyl methacrylate |  |  |  | 10 |
| Total | 100 | 100 | 100 | 100 |
| Bead adhesion to EPDM | | | | |
| SikaFast-5211 NT | No adhesion | Moderate adhesion | Good adhesion | Good adhesion |
| SikaTack Plus | No adhesion | No adhesion | | |
| SikaFlex-221 | No adhesion | No adhesion | | |

[1]Triethylborane-1,3-diaminopropane complex;
[2]Tetrahydrofurfuryl methacrylate The results of these investigations show that the adhesion of acrylate adhesives such as SikaFast-5211 NT on EPDM can be improved further by pretreatment with a combination of a borane complex and acrylates, in comparison to the use of the borane complex without acrylates. A comparison of samples 3 and 4 shows, moreover, that the nature of the acrylate has no substantial influence on the adhesion achieved. For the two polyurethane-based adhesives SikaTack Plus and SikaFlex-221, which contain no radically curable monomers, in contrast, there is no improvement in adhesion after surface treatment with boranes.

Example 7

In accordance with Example 1, various substrates were first cleaned with ethyl acetate and then pretreated with a composition of 80 wt % ethyl acetate, 10 wt % triethylborane-1,3-diaminopropane complex, and 10 wt % tetrahydrofurfuryl methacrylate. Subsequently various adhesives were applied to the substrates thus pretreated, these adhesives comprising two acrylate adhesives (SikaFast-5211 NT and ScotchWeld DP 810) and also two epoxy adhesives (SikaPower 477-R and ScotchWeld DP 490). The torsional strengths of the adhesive bonds were determined using the test protocol specified in Example 1, and are reproduced for the various substrates in Table 6 below:

TABLE 6

| Substrate | SikaFast-5211 NT | SikaPower 477-R | ScotchWeld DP 810 | ScotchWeld DP 490 |
|---|---|---|---|---|
| SBR Rocholl | | | | |
| Cleaning with ethyl acetate | 0.1 100% AF<br>0.2 100% AF | 7.5<br>95% AF/5% SF<br>8.2<br>70% AF/30% SF | 2.8 100% AF<br>3.0 100% AF | 10.6 100% SF<br>10.4 100% SF |
| Borane activator | 5.8<br>60% CF/40% AF<br>7.0<br>70% CF/30% AF | 6.9 100% AF<br>7.7 100% AF | 9.2 100% AF<br>7.8 100% AF | 8.2 100% AF<br>8.6<br>90% AF/10% SF |
| NBR Rocholl | | | | |
| Cleaning with ethyl acetate | 1.9 100% AF<br>1.8 100% AF | 3.5<br>50% SF/50% AF<br>3.0 SF40% AF60% | 2.0 AF100%<br>1.4 AF100% | 5.2 100% SF<br>5.6 100% SF |
| Borane activator | 4.2 CF10%/AF90%<br>3.9<br>CF10% A/B90% | 2.3<br>5% SF/95% AF<br>3.0<br>10% SF/90% AF | 4.0 100% AF<br>4.1 100% AF | 4.0 100% AF<br>4.3 100% AF |
| EPDM Rocholl | | | | |
| Cleaning with ethyl acetate | 4.0 100% SF<br>3.1 100% SF | 1.6 100% AF<br>1.5 100% AF | | 4.2 100% SF<br>3.4 100% SF |
| Borane activator | 4.7<br>60% CF/40% AF*<br>4.8<br>60% CF/40% AF* | 1.6 100% AF<br>1.7 100% AF | | 1.9 100% SF<br>2.0 100% SF |

In Table 6 AF denotes adhesive fracture, SF denotes substrate fracture, and CF denotes cohesive fracture.
The numerical figures of the torsional strength are in MPa.
*represents abhesive fracture of the aluminum test specimen.
The values reported are in each case those from two individual measurements.

The results of these investigations show that in the case of the two acrylate adhesives, pretreatment with the borane complex/acrylate mixture increases the torsional strength of the adhesive bond. With the epoxy adhesives, in contrast, the pretreatment does not produce any apparent improvement in torsional strength.

Additionally, the peel force of the adhesives on various substrates was ascertained. The measurements and samples needed for this purpose were conducted/produced in the same way as for Example 2. The pretreatment composition used was, as above, a composition of 80 wt % ethyl acetate, 10 wt % triethylborane-1,3-diaminopropane complex, and 10 wt % tetrahydrofurfuryl methacrylate. The results of these investigations are reproduced in Table 7 below.

TABLE 7

| | Rocholl EPDM | | | TPO Membrane Sarnafil ® TS-77-15 | PVC Membrane SikaPlan ® 15 G |
|---|---|---|---|---|---|
| Substrate | SikaFast-5211 NT | SikaPower 477-R | ScotchWeld DP 490 | SikaFast-5211 NT | SikaFast-5211 NT |
| Cleaning with ethyl acetate | 4.9 N/mm<br>70% SF/30% AF | 0.67 N/mm<br>100% AF | 2.7 N/mm<br>100% AF | 0.46 N/mm<br>100% AF | 1.7 N/mm<br>100% AF |

TABLE 7-continued

| | Rocholl EPDM | | | TPO Membrane Sarnafil® TS-77-15 | PVC Membrane SikaPlan® 15 G |
|---|---|---|---|---|---|
| Substrate | SikaFast-5211 NT | SikaPower 477-R | ScotchWeld DP 490 | SikaFast-5211 NT | SikaFast-5211 NT |
| Borane activator | 4.9 N/mm 100% SF | 1.1 N/mm 100% AF | 3.0 N/mm 100% SF | 0 N/mm 100% AF | 2.1 N/mm 100% AF |

In the table, AF denotes adhesive fracture and SF denotes substrate fracture. Improved adhesive bonding is evident either from an increased peel force or from an increased proportion of substrate fracture relative to adhesive fracture.

The investigation of the peel force is also evidence that the pretreatment of EPDM with borane complexes results in improved adhesive bonding. In the case of substrates such as PVC and TPO membranes (TPO=thermoplastic polyolefin) which contain no unsaturated units, in contrast, no improvement can be detected in the adhesive bonding. From this it may be inferred that the unsaturated units in the substrate are incorporated at least partly into the polymer of the adhesive as it forms, something which is not possible in the case of the PVC and TPO substrates.

Example 8: Splicing of Fabric-Reinforced Belt Ends

Two test specimens with dimensions of 16 mm×25 mm×100 mm (belt type 1600 EP 630/4 8/3V) were provided with incisions 25 mm long and 8 mm in depth, allowing the belt ends to be placed overlappingly on one another. The woven fabric reinforcement at both belt ends remained intact. The regions for joining were subsequently cleaned with isopropanol, ethyl acetate, and xylene (in that order), and the bond area was coated with a mixture of 10 wt % triethylborane-1,3-diaminopropane complex, 10 wt % THFMA, and 80 wt % ethyl acetate; following this coating, the solvent was allowed to evaporate. The surface thus pretreated had the adhesive SikaFast-5211 NT applied to it, the two belt ends were joined to one another, and the adhesive was cured as indicated in Table 8. The tensile shear strength of the spliced test specimens was subsequently determined in accordance with EN 1465 at 23° C. and 50% relative humidity (rh). The results of these measurements are likewise reported in Table 8.

TABLE 8

| Curing conditions | Tensile shear strength [MPa] |
|---|---|
| 7 days RT | 4.15 |
| 30 days RT | 4.48 |
| 28 days 40° C. | 4.58 |
| 14 days 40° C./100% rh | 2.59 |

Example 9: Splicing of Steel Cable-Reinforced Belt Ends

Two belt ends of a Continental ST 500K 500 mm belt having in each case four steel cables 2.7 mm in thickness were prepared in such a way that the steel cables are exposed and the edges of the belts have been cut into at an angle. The lower and upper sides had a thickness of 4 and 5 mm, respectively. For each individual measurement, the exposed steel cables were shortened to a uniform length of between 120 to 300 mm and inserted into one another in such a way that the steel cable ends of one belt come to lie between the steel cable ends of the other belt. The regions of the edges and cables to be joined were cleaned with isopropanol, ethyl acetate, and xylene (in that order) and the bond area was coated with a mixture of 10 wt % triethylborane-1,3-diaminopropane complex, 10 wt % THFMA, and 80 wt % ethyl acetate. The solvent was then allowed to evaporate. The adhesive SikaFast-5211 NT was applied to the region thus pretreated.

For some of the test specimens, additionally, a thin layer of the test specimen material was used. This material was mounted above and below the steel cables in such a way that joining produced a sandwich structure composed of the thin layers and the adhesive/steel cable layer. In this case, the surfaces of the thin layers of the test specimen material joined with the adhesive were also cleaned and pretreated as described above.

Prior to curing, the surface of all the test specimens was smoothed in order to give a uniform surface. The resulting test specimens were cured and tested for the strength of the adhesive bond, by clamping the two ends of the resulting test specimens into a holding device. The holding device was then moved apart with a velocity of 50 mm/min. The maximum force on fracture of the belt (Fmax) in N was determined in each case. The results of the measurements are set out in Table 9 below.

TABLE 9

| Test specimen designation | Fmax [N] |
|---|---|
| Wire | 7774 |
| Test specimen without splice | 24628 |
| Test specimen with 120 mm splice[1] | 15637 |
| Test specimen with 120 mm splice[2] | 20554 |
| Test specimen with 140 mm splice[1] | 19173 |
| Test specimen with 140 mm splice[2] | 21437 |
| Test specimen with 160 mm splice[1] | 21369 |
| Test specimen with 160 mm splice[2] | 23395 |
| Test specimen with 200 mm splice[1] | 21707 |
| Test specimen with 200 mm splice[2] | 24280 |
| Test specimen with 300 mm splice[1] | 23342 |
| Test specimen with 300 mm splice[2] | 22959 |

[1]Splice region consisted only of the steel cables and the adhesive;
[2]Splice region consisted of a sandwich structure of two layers of the test specimen material, disposed around the steel cables/adhesive as interlayer.

In the case of the test specimens with a splice length of 120 mm and 140 mm, failure of the splice region was ascertained, although in each case forces in the range from 15 000 to 21 500 N were required. In the case of splice lengths of 160 mm or more, the bonds held, but the belts yielded in the region of the belt material or of the cables. For this purpose, forces of more than 20 000 N were required.

The invention claimed is:

1. A method for treating substrates, comprising
a) applying a composition which comprises at least one latent alkylborane and is substantially free from decomplexing agents for the latent alkylborane to a substrate which comprises a material having unsaturated units, wherein the material having unsaturated units is a material based on EPDM, NBR, SBR, or a mixture thereof,
b) applying a radically curable substance to the substrate pretreated with the latent alkylborane, and
c) curing the radically curable substance to form a composite structure.

2. The method as claimed in claim 1, wherein the radically curable substance is a paint, a coating, a sealing material, an adhesive or a filling compound.

3. The method as claimed in claim 1, wherein between step b) and step c), the substrate is contacted with an additional substrate such that the radically curable substance is disposed between the substrate and the additional substrate, and the radically curing substance is in the form of an adhesive.

4. The method as claimed in claim 1, wherein the substrate consists of the material having unsaturated units.

5. The method as claimed in claim 1, wherein the radically curable substance is a substance based on acrylates.

6. The method as claimed in claim 1, wherein the composition comprising at least one latent alkylborane has a pH of about 7 or more.

7. The method as claimed in claim 1, wherein the composition comprising at least one latent alkylborane further comprises a solvent and/or comprises at least one radically curable monomer.

8. The method as claimed in claim 1, wherein the concentration of the at least one latent alkylborane in the composition is about 2.5 to 30 wt %.

9. The method as claimed in claim 1, wherein the latent alkylborane is present in the form of a trialkylborane-amine complex in which the alkyl group is identical or different and has 1 to 6 carbons.

10. The method as claimed in claim 9, wherein the amine in the trialkylborane-amine complex is in the form of an alkylenediamine having at least one primary amino group.

11. A composite structure obtainable by a method as claimed in claim 1.

12. A method for treating substrates, comprising
a) applying a composition which comprises at least one latent alkylborane and is substantially free from decomplexing agents for the latent alkylborane to a substrate which comprises a material having unsaturated units, wherein the latent alkylborane applied to the substrate is contacted with a decomplexing agent,
b) applying a radically curable substance to the substrate pretreated with the latent alkylborane, and
c) curing the radically curable substance to form a composite structure.

13. A method of priming a substrate that comprises a material having unsaturated units, comprising applying a composition which comprises at least one latent alkylborane and is substantially free from decomplexing agents for the latent alkylborane to the substrate, wherein the material having unsaturated units is a material based on EPDM, NBR, SBR, or a mixture thereof.

14. A method for splicing elastic belts having reinforcing elements, comprising:
a) at least partially exposing the reinforcing elements of the belts,
b) applying a composition which comprises at least one latent alkylborane and is substantially free from decomplexing agents for the latent alkylborane to the reinforcing elements and optionally to the edges of the belts,
c) applying an adhesive to the areas pretreated with the latent alkylborane, and
d) bringing at least portions of the elastic belts with the applied adhesive into contact, and curing the adhesive, to form a composite structure.

15. The method as claimed in claim 14, wherein in the region of the exposed reinforcing elements, sheetlike elements of elastic belt material are provided which extend over the region of the exposed reinforcing elements of the belt, in that the composition in step b) is applied to these elements, and in that the elements in step c) are contacted with the applied adhesive to form a sandwich structure, and this sandwich structure is cured in step d).

16. An elastic belt obtainable by a method as claimed in claim 14.

* * * * *